(12) United States Patent
Missoum et al.

(10) Patent No.: US 7,258,080 B2
(45) Date of Patent: Aug. 21, 2007

(54) FUEL-FIRED DUAL TANK WATER HEATER HAVING DUAL PASS CONDENSING TYPE HEAT EXCHANGER

(75) Inventors: Ozzie Missoum, Pike Road, AL (US); Gregory M. Welk, Prattville, AL (US); Phillip W. Stephens, Millbrook, AL (US); Qian Zhang, Montgomery, AL (US); Jeffrey M. Haney, Montgomery, AL (US)

(73) Assignee: Rheem Manufacturing Company, Atlanta, GA (US)

( * ) Notice: Subject to any disclaimer, the term of this patent is extended or adjusted under 35 U.S.C. 154(b) by 184 days.

(21) Appl. No.: 11/222,351

(22) Filed: Sep. 8, 2005

(65) Prior Publication Data

US 2007/0062463 A1 Mar. 22, 2007

(51) Int. Cl.
*F24H 1/38* (2006.01)
(52) U.S. Cl. ............... 122/18.1; 122/18.31; 126/350.1
(58) Field of Classification Search .............. 122/20 R, 122/36, 31.1, 18.1, 18.2, 43, 250 R, 250 S, 122/251, 18.31; 126/360.1, 350.1
See application file for complete search history.

(56) References Cited

U.S. PATENT DOCUMENTS

| | | | |
|---|---|---|---|
| 420,019 A * | 1/1890 | Rice | 122/339 |
| 675,919 A | 6/1901 | Arvonen | |
| 1,150,948 A | 8/1915 | Laziny | |
| 1,260,757 A | 3/1918 | Davis | |
| 1,813,906 A | 7/1931 | Caron | |
| 1,993,725 A | 3/1935 | Walker et al. | |
| 2,059,128 A | 10/1936 | Matthews | |
| 2,072,467 A | 3/1937 | Nore | |
| 2,147,046 A | 2/1939 | Leoni | |
| 2,653,583 A | 9/1953 | Granger | |
| 3,351,042 A * | 11/1967 | MacDonald | 122/250 R |
| 4,030,302 A | 6/1977 | Mankouski | |
| 4,203,392 A * | 5/1980 | McLane | 122/18.3 |
| 4,530,347 A * | 7/1985 | Baker et al. | 126/355.1 |
| 4,676,199 A * | 6/1987 | Daugirda et al. | 122/13.01 |
| 5,027,749 A * | 7/1991 | Cifaldi | 122/18.31 |
| 5,765,546 A * | 6/1998 | Mandeville et al. | 126/350.1 |

* cited by examiner

*Primary Examiner*—Gregory Wilson
(74) *Attorney, Agent, or Firm*—Haynes and Boone, LLP

(57) ABSTRACT

A fuel-fired commercial water heater has upper and lower communicated tank portions which are separated by a plenum forming a vertically intermediate portion of a dual pass condensing type heat exchanger. A lower portion of the heat exchanger is defined by a series of vertical flue tubes extending through the lower tank and intercommunicating the plenum with a combustion chamber disposed beneath the lower tank and having a fuel burner with a discharge portion communicated therewith. An upper portion of the heat exchanger is defined by a vertical flue pipe, disposed in the upper tank, that extends upwardly from the plenum and then coils downwardly around itself and horizontally exits the upper tank. During firing of water heater the burner flows flue gases sequentially through the lower tank flue tubes, the plenum, and the upper tank coiled flue pipe structure.

16 Claims, 1 Drawing Sheet

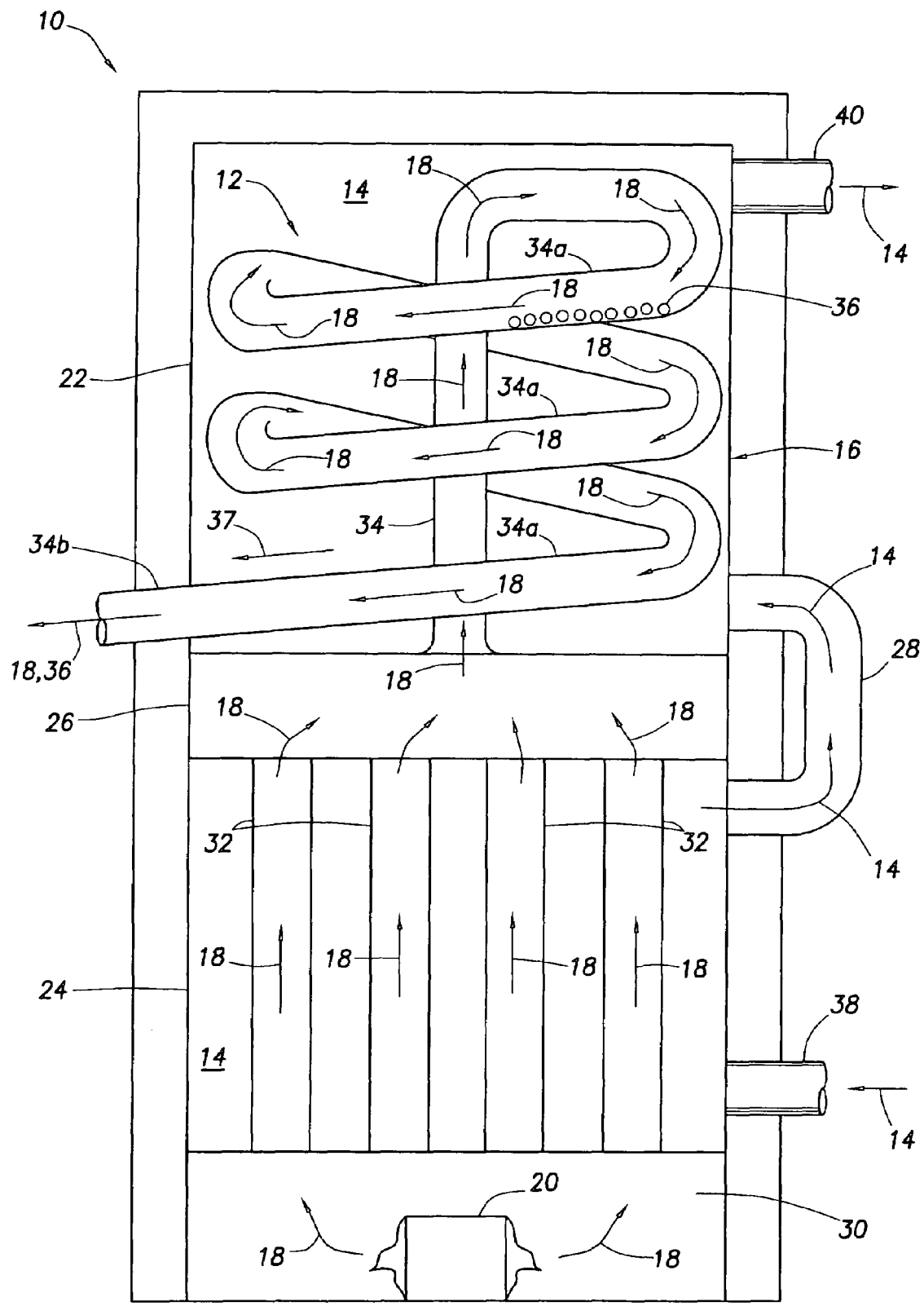

FUEL-FIRED DUAL TANK WATER HEATER HAVING DUAL PASS CONDENSING TYPE HEAT EXCHANGER

BACKGROUND OF THE INVENTION

The present invention generally relates to fuel-fired fluid heating devices and, in a representatively illustrated embodiment thereof, more particularly provides a fuel-fired water heater having a dual tank structure and a specially designed dual pass condensing type heat exchanger incorporated therein.

Conventional fuel-fired water heaters are typically of a "single pass", non-condensing configuration, meaning that the hot combustion gases used to heat the tank-stored water are subjected to only a single pass through a heat exchanger structure (usually a vertical flue) within the tank before being discharged from the water heater to, for example, an external vent structure, and that flue gas condensation does not occur to any appreciable degree in the heat exchanger structure within the water heater tank. In this conventional type of fuel-fired water heater, the overall thermal efficiency is typically limited to about 80-85%. Various proposals have been made to provide fuel-fired water heaters with condensing type single-pass heat exchangers (i.e., in which flue gases condense within the heat exchanger). However, previously proposed single-pass condensing type heat exchange structures incorporated in fuel-fired water heaters typically provide the water heaters with thermal efficiencies limited to the 85-90% range.

In an attempt to increase this thermal efficiency to above 95%, multi-pass condensing heat exchangers of varying configurations and types have been proposed for installation within the tank portions of fuel-fired water heaters. While such previously proposed multi-pass condensing type heat exchangers have met this thermal efficiency goal, they have also undesirably presented various problems, limitations and disadvantages. These include increased heat exchanger complexity, higher material and fabricational costs, condensate management problems, increased operational noise, and reduced heat exchanger operational life.

It would thus be desirable to provide a fuel-fired water heater, or other type of fuel-fired fluid heating device, with an improved multi-pass condensing type heat exchanger. It is to this goal that the present invention is primarily directed.

SUMMARY OF THE INVENTION

In carrying out principles of the present invention, in accordance with a representative embodiment thereof, a fuel-fired fluid heating apparatus, illustratively a commercial water heater, is provided with a dual tank construction and a specially designed multi-pass condensing type heat exchanger structure having a heat transfer efficiency greater than 95 percent.

In the representative embodiment of the water heater it comprises vertically spaced apart top and bottom water storage tanks having intercommunicated interiors. The bottom tank has an inlet for receiving water to be heated, and the top tank has an outlet for discharging heated water. A receiving plenum is interposed between said top and bottom water storage tanks.

The multi-pass condensing type heat exchanger includes a spaced plurality of vertical tubes extending through the interior of the bottom tank and communicating with said receiving plenum, and a flue pipe disposed within the top tank. The flue pipe has a vertical inner longitudinal portion communicating with the receiving plenum, an intermediate longitudinal portion downwardly coiled around the inner longitudinal flue pipe portion, and an outer longitudinal portion extending outwardly through a side wall portion of the top tank. The water heater also if provided with combustion apparatus operative to flow hot combustion gases sequentially through the vertical tubes, the receiving plenum and the flue pipe.

According to other aspects of the invention, the combustion apparatus includes a fuel burner (which may be either a powered or non-powered fuel burner) having a discharge portion communicated with a combustion chamber positioned beneath the bottom side of the bottom tank and having an interior communicated with open bottom ends of the vertical tubes. During firing of the fuel burner, condensate forms in the intermediate longitudinal portion of the flue pipe. The outer longitudinal portion of the flue pipe has an outer end portion vertically sloped to drain away the condensation from the water heater.

BRIEF DESCRIPTION OF THE DRAWING

The single drawing figure is a schematic cross-sectional view through a specially designed fuel-fired dual tank water heater having a multi-pass condensing type heat exchanger incorporated therein and embodying principles of the present invention.

DETAILED DESCRIPTION

Illustrated in the accompanying single drawing figure is a fuel-fired water heater 10, representatively a commercial water heater, having a specially designed two pass condensing type heat exchanger 12 used to heat pressurized water 14 stored in its overall externally insulated tank structure 16. During firing of the water heater 10, hot flue gases 18 from a fuel burner 20 at the bottom of the water heater are flowed through the heat exchanger 12 to transfer combustion heat, with a thermal efficiency of 95% or above, to the stored water 14. Burner 20, which may be either a powered fuel burner or a non-powered fuel burner, receives gaseous fuel and combustion air from sources thereof (not illustrated) in a suitable conventional manner.

The water heater tank structure 16 has separate upper and lower tank portions 22,24 separated by a flue gas receiving plenum 26 and each holding quantities of the stored water 14. Plenum 26 defines a vertically intermediate portion of the overall heat exchanger structure 12. The interiors of the two tank portions 22,24 are interconnected by a water transfer pipe 28, and the burner 20 has a discharge portion communicated with a combustion chamber 30 disposed beneath the lower end of the lower tank portion 24.

Extending vertically through the interior of the lower tank 24, and intercommunicating the interiors of the combustion chamber 30 and the flue gas receiving plenum 26 are a spaced series of primary flue tubes 32 that define a lower portion of the overall heat exchanger structure 12. A secondary flue pipe 34 extends upwardly from the top side of the plenum 26 and communicates with its interior. Adjacent the top end of the upper tank 22, the vertical flue pipe 34 coils downwardly around itself within the upper tank 22, in coils 34a, terminating in a leftwardly and downwardly sloped discharge portion 34b that extends outwardly through an exterior side of the water heater 10. The flue pipe structure 34,34a,34b defines an upper portion of the overall heat exchanger structure 12.

During firing of the water heater 10, hot flue gases 18 from within the combustion chamber 30 flow upwardly through the flue tubes 32 into the plenum 26 and then upwardly through the vertical flue pipe 34 (the tubes 32, the plenum 26 and the initial vertical portion of the flue pipe 34 collectively defining the first pass portion of the heat exchanger 12), and then flows downwardly through the flue pipe coils 34a (defining the second pass of the heat exchanger structure 12), with condensate 36 forming in the tube coils 34a and being discharged from the heat exchanger 12 via the pipe coil discharge end portion 34b with the flue gases 18. As indicated by the slope arrow 37, the pipe coil discharge end portion 34b slopes downwardly and to the left as viewed in the single drawing figure.

Cold water entering the illustrated water inlet 38 flows into the lower tank 24, flows externally around the vertical flue tubes 32 and receives combustion heat therefrom. The partially heated water 14 then flows into the upper tank 22 via the water transfer pipe 28. The water 14 entering the upper tank 22 then flows around the flue pipe 34 and its coils 34a, receives additional combustion heat therefrom, and then is discharged from the water heater 10 via the indicated top end water outlet 40 during on-demand outflow of pressurized stored water 14 from the dual tank structure 16.

Compared to conventional multi-pass condensing type heat exchangers utilized in fuel-fired water heaters, the heat exchanger structure 12 representatively illustrated and described herein provides a variety of advantages which may include, for example, the capability of providing its associated water heater with a thermal efficiency well above 95%, simplified heat exchanger configuration, reduced material and fabricational costs, quieter operation, increased heat exchanger life, and improved condensate management.

While a fuel-fired water heater has been representatively illustrated and described herein, it will be readily apparent to those of skill in this particular art that principles of the present invention are also applicable to other types of fuel-fired fluid heating devices, such as for example boilers, and are not limited to water heaters. Moreover, while the heat exchanger structure 12 has been illustrated in an upflow configuration, it could also be vertically inverted if desired and utilized in a downflow configuration. Alternatively, without departing from principles of the present invention, the heat exchanger structure 12 could be horizontally oriented if desired.

The foregoing detailed description is to be clearly understood as being given by way of illustration and example only, the spirit and scope of the present invention being limited solely by the appended claims.

What is claimed is:

1. An apparatus for heating a fluid, comprising:
a first tank for holding a first quantity of a fluid to be heated;
a second tank for holding a second quantity of the fluid to be heated, said second tank being spaced apart from said first tank in a first direction, one of said first and second tanks having a fluid receiving inlet, and the other of said first and second tanks having a fluid discharge outlet;
a receiving plenum interposed between said first and second tanks;
a fluid transfer conduit structure interconnected between said first and second tanks;
a combustion chamber, said first tank being interposed between said combustion chamber and said receiving plenum;
a spaced plurality of primary flue tubes longitudinally extending through said first tank in said first direction and interconnecting said combustion chamber and said receiving plenum;
a secondary flue pipe having an inner longitudinal portion extending in said first direction from said receiving plenum through said second tank, an intermediate longitudinal portion coiling about said inner longitudinal portion in a second direction opposite from said first direction, and an outer longitudinal portion passing outwardly through said second tank; and
a fuel burner operative during firing thereof to flow hot combustion gases sequentially through said combustion chamber, said primary flue tubes, said receiving plenum and said secondary flue pipe.

2. The apparatus of claim 1 wherein:
said apparatus is a fuel-fired water heater.

3. The apparatus of claim 1 wherein:
said apparatus is a fuel-fired commercial water heater.

4. The apparatus of claim 1 wherein:
said first direction extends generally vertically.

5. The apparatus of claim 1 wherein:
said fuel burner has a discharge portion communicated with said combustion chamber.

6. The apparatus of claim 1 wherein:
said primary flue tubes, said receiving plenum and said secondary flue pipe collectively define a multi-pass condensing type heat exchanger.

7. The apparatus of claim 6 wherein:
condensate forms in said intermediate longitudinal portion of said secondary flue pipe during firing of said fuel burner.

8. The apparatus of claim 7 wherein:
said outer longitudinal portion of said secondary flue pipe is sloped in a manner draining away from said apparatus condensate formed in said intermediate longitudinal portion of said secondary flue pipe.

9. The apparatus of claim 6 wherein;
said heat exchanger has a heat transfer efficiency greater than about ninety five percent.

10. A fuel-fired water heater comprising:
vertically spaced apart top and bottom water storage tanks having intercommunicated interiors; said bottom tank having an inlet for receiving water to be heated, and said top tank having an outlet for discharging heated water;
a receiving plenum interposed between said top and bottom water storage tanks;
a multi-pass condensing type heat exchanger having:
a spaced plurality of vertical tubes extending through the interior of said bottom tank and communicating with said receiving plenum, and
a flue pipe disposed within said top tank and having a vertical inner longitudinal portion communicating with said receiving plenum, an intermediate longitudinal portion downwardly coiled around said inner longitudinal portion, and an outer longitudinal portion extending outwardly through a side wall portion of said top tank; and
combustion apparatus operative to flow hot combustion gases sequentially through said vertical tubes, said receiving plenum and said flue pipe.

11. The fuel-fired water heater of claim 10 wherein:
said fuel-fired water heater is a commercial water heater.

12. The fuel-fired water heater of claim 10 wherein:
said combustion apparatus includes a fuel burner.

13. The fuel-fired water heater of claim 11 wherein:

said fuel-fired water heater further comprises a combustion chamber disposed beneath said bottom tank and communicated with bottom ends of said vertical tubes, and said fuel burner has a discharge portion communicated with said combustion chamber.

14. The fuel-fired water heater of claim 10 wherein:

said heat exchanger has a heat transfer efficiency greater than about ninety five percent.

15. The fuel-fired water heater of claim 10 wherein:

condensate forms in said intermediate longitudinal portion of said flue pipe during operation of said combustion apparatus.

16. The fuel-fired water heater of claim 15 wherein:

said outer longitudinal portion of said flue pipe is vertically sloped to drain away said condensate from said fuel-fired water heater.

* * * * *